United States Patent
Takahashi et al.

(10) Patent No.: US 8,247,131 B2
(45) Date of Patent: Aug. 21, 2012

(54) FUEL CELL STACK

(75) Inventors: Ken Takahashi, Shimotsuga-gun (JP);
Ryoichi Yoshitomi, Utsunomiya (JP);
Daisuke Wachi, Shioya-gun (JP);
Keisuke Andou, Saitama (JP); Ayumu Ishizuka, Utsunomiya (JP); Tadashi Nishiyama, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 1076 days.

(21) Appl. No.: 12/137,039

(22) Filed: Jun. 11, 2008

(65) Prior Publication Data

US 2008/0305368 A1     Dec. 11, 2008

(30) Foreign Application Priority Data

Jun. 11, 2007  (JP) .................................. 2007-153923
May 14, 2008  (JP) .................................. 2008-127490

(51) Int. Cl.
*H01M 2/20* (2006.01)

(52) U.S. Cl. ........ 429/469; 429/452; 429/467; 429/470; 429/471; 429/511

(58) Field of Classification Search .................. 429/452, 429/453, 467, 469, 470, 471, 511
See application file for complete search history.

(56) References Cited

U.S. PATENT DOCUMENTS

| 2006/0024557 A1* | 2/2006 | Iritsuki et al. ................... 429/37 |
| 2006/0088752 A1* | 4/2006 | Sakano et al. ................... 429/34 |
| 2006/0177722 A1 | 8/2006 | Inagaki |

FOREIGN PATENT DOCUMENTS

| JP | 2005-56814 | 3/2005 |
| JP | 2005-71869 | 3/2005 |

\* cited by examiner

*Primary Examiner* — Patrick Ryan
*Assistant Examiner* — Ben Lewis
(74) *Attorney, Agent, or Firm* — Nelson Mullins Riley & Scarborough LLP; Anthony A. Laurentano

(57) ABSTRACT

A fuel cell stack includes a load receiver provided at an outer end of a fuel cell unit, a guide receiver provided in a box, and a pressure receiver provided in at least one corner in the box. The guide receiver abuts against the load receiver for receiving the external load. The pressure receiver protrudes toward the fuel cell unit. The pressure receiver abuts against a corner of the fuel cell unit for receiving the load. The pressure receiver has a resin receiver, and the resin receiver abuts against a curved portion of the fuel cell unit for supporting the fuel cell unit.

14 Claims, 14 Drawing Sheets

FUEL CELL STACK

BACKGROUND OF THE INVENTION

1. Field of the Invention

The present invention relates to a fuel cell stack comprising fuel cells stacked together, and a box containing the fuel cells. Each of the fuel cells is formed by stacking an electrolyte electrode assembly and a separator. The electrolyte electrode assembly includes a pair of electrodes and an electrolyte interposed between the electrodes.

2. Description of the Related Art

For example, a solid polymer electrolyte fuel cell employs a membrane electrode assembly (electrolyte electrode assembly) which includes an anode, a cathode, and an electrolyte membrane interposed between the anode and the cathode. The electrolyte membrane is a polymer ion exchange membrane. The membrane electrode assembly is sandwiched between separators to form the fuel cell.

The fuel cell of this type is used in a vehicle application, for example. For this purpose, in general, several tens to hundreds of fuel cells are stacked together, and the stack of the fuel cells is placed in a box to form a fuel cell stack. However, when an impact (external load) in a direction intersecting the stacking direction of the fuel cells is applied to the fuel cell stack, lateral displacement may occur in the fuel cells undesirably.

In an attempt to address the problem, for example, a fuel cell as disclosed in Japanese Laid-Open Patent Publication No. 2005-056814 is known. According to the disclosure, a unit cell is formed by sandwiching an MEA (membrane electrode assembly) between separators. A plurality of the unit cells are adhered together using adhesive to form a multi-cell assembly. The multi-cell assembly and a module frame form a multi-cell module. Terminals, insulators, and end plates are provided at opposite ends in a direction of stacking the multi-cell modules. In this state, a casing (outer member) is provided around the multi-cell modules such that outer binding members are provided between the multi-cell modules and the casing. Further, the casing is fixed by bolts and nuts to form a fuel cell stack.

However, in the conventional technique, the module frames holding the multi-cell assemblies each formed by adhering the unit cells together using the adhesive, the outer binding members receiving the module frames, and the casing receiving the outer binding members are provided, and such structure is significantly complicated.

Further, the performance of assembling the fuel cell stack is low, and the air and water cannot be discharged from the fuel cell stack smoothly. Moreover, the outer size of the fuel cell stack is large, and the volume and weight of the fuel cell stack are large.

SUMMARY OF THE INVENTION

The present invention has been made to solve the problem, and an object of the present invention is to provide a fuel cell stack having simple structure in which it is possible to reliably prevent lateral displacement of a fuel cell due to an external load or an inertia force of the fuel cell itself, and it is possible to achieve reduction in the overall size and weight of the fuel cell stack.

The present invention relates to a fuel cell stack comprising fuel cells stacked together, and a box containing the fuel cells. Each of the fuel cells is formed by stacking an electrolyte electrode assembly and a separator. The electrolyte electrode assembly includes a pair of electrodes and an electrolyte interposed between the electrodes.

The fuel cell stack includes a guide provided at an outer end of the fuel cell. The guide protrudes outwardly from a side of the separator. Further, the fuel cell stack includes a guide receiver protruding inwardly from the box. The guide receiver abuts against the guide for receiving an external load.

Further, according to another aspect of the present invention, the fuel cell stack includes a guide provided at an outer end of the fuel cell, and a guide receiver provided in the box. The guide receiver abuts against the guide for receiving an external load. The guide receiver is divided in a stacking direction of the fuel cells.

In the present invention, when an external load is applied to the fuel cell in a direction intersecting the stacking direction of the fuel cells, the guide provided at the outer end of each of the fuel cells abuts against the guide receiver in the box. Thus, the external load is suitably distributed, and the local surface pressure applied to each of the fuel cells is reduced. Accordingly, it is possible to effectively prevent the fuel cells from being damaged.

Thus, with the simple structure, it is possible to reliably prevent lateral displacement of the fuel cells due to the external load. Further, reduction in the overall size and weight of the fuel cell stack is achieved.

Moreover, the number of components in the fuel cell stack is small. Thus, the fuel cell stack can be assembled easily, and improvements in air ventilation and water discharge in the fuel cell stack are achieved easily.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
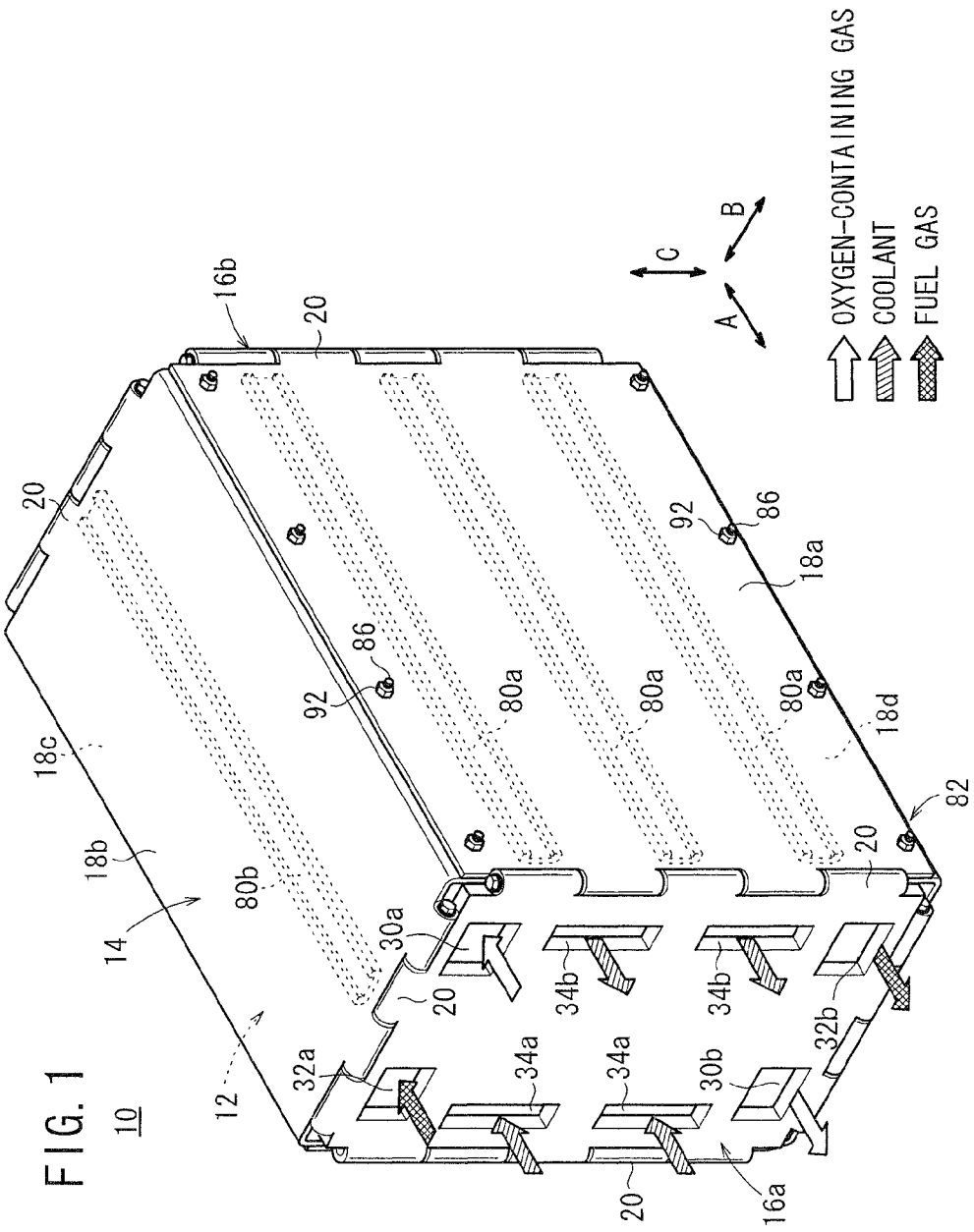
FIG. 1 is a perspective view schematically showing a fuel cell stack according to a first embodiment of the present invention.

FIG. 1 is a perspective view schematically showing a fuel cell stack 10 according to a first embodiment of the present invention.

The fuel cell stack 10 includes a plurality of fuel cell units 12 stacked together in a direction indicated by an arrow A and a box 14 containing the fuel cell units 12. The box 14 includes end plates 16a, 16b provided at opposite ends of the fuel cell units 12 in the stacking direction, four side panels (panel members) 18a to 18d provided on sides of the fuel cell units 12, and hinge mechanisms 20 for coupling the end plates 16a, 16b and the side panels 18a to 18d together. The side panels 18a to 18d are made of stainless steel (e.g., SUS 304) or other metal material, or carbon material.

Figure 2:
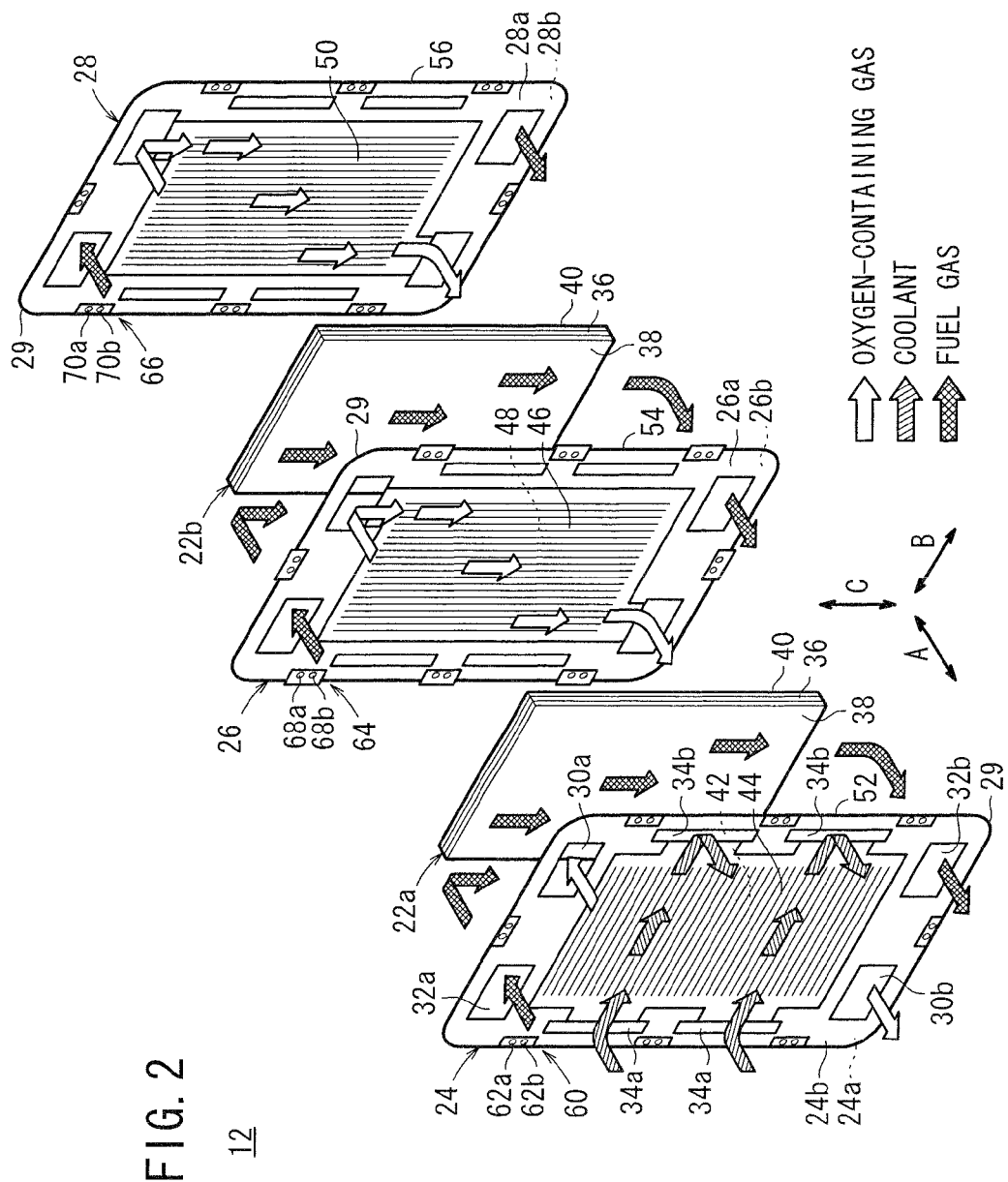
FIG. 2 is an exploded perspective view showing a fuel cell unit of the fuel cell stack.

As shown in FIG. 2, the fuel cell unit 12 includes a first membrane (electrolyte) electrode assembly 22a, a second membrane electrode assembly 22b, a first separator 24, a second separator 26, and a third separator 28. The first membrane electrode assembly 22a is sandwiched between the first separator 24 and the second separator 26, and the second membrane electrode assembly 22b is sandwiched between the second separator 26 and the third separator 28.

Each of the first to third separators 24, 26, 28 includes curved portions 29 at four corners. In the illustrated embodiment, the first to third separators 24, 26, 28 are metal separators. Alternatively, carbon separators may be adopted.

At one end (upper end) of the fuel cell unit 12 in a longitudinal direction indicated by an arrow C in FIG. 2, an oxygen-containing gas supply passage 30a for supplying an oxygen-containing gas and a fuel gas supply passage 32a for supplying a fuel gas such as a hydrogen-containing gas are provided. The oxygen-containing gas supply passage 30a and the fuel gas supply passage 32a extend through the fuel cell unit 12 in the direction indicated by the arrow A.

At the other end (lower end) of the fuel cell unit 12 in the longitudinal direction, a fuel gas discharge passage 32b for discharging the fuel gas and an oxygen-containing gas discharge passage 30b for discharging the oxygen-containing gas are provided. The fuel gas discharge passage 32b and the oxygen-containing gas discharge passage 30b extend through the fuel cell unit 12 in the direction indicated by the arrow A.

At one end of the fuel cell unit 12 in a lateral direction indicated by an arrow B, two coolant supply passages 34a for supplying a coolant are provided, and at the other end of the fuel cell unit 12 in the lateral direction, two coolant discharge passages 34b for discharging the coolant are provided.

For example, each of the first membrane electrode assembly 22a and the second membrane electrode assembly 22b includes an anode 38, a cathode 40, and a solid polymer electrolyte membrane 36 interposed between the anode 38 and the cathode 40. The solid polymer electrolyte membrane 36 is formed by impregnating a thin membrane of perfluorosulfonic acid with water, for example.

Each of the anode 38 and the cathode 40 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 38 and the electrode catalyst layer of the cathode 40 are fixed to both surfaces of the solid polymer electrolyte membrane 36, respectively.

The first separator 24 has a first fuel gas flow field 42 on a surface 24a facing the first membrane electrode assembly 22a. The first fuel gas flow field 42 is connected to the fuel gas supply passage 32a and the fuel gas discharge passage 32b. For example, the first fuel gas flow field 42 includes a plurality of grooves extending in the direction indicated by the arrow C. A coolant flow field 44 connected to the coolant supply passages 34a and the coolant discharge passages 34b is formed on a surface 24b of the first separator 24. The coolant flow field 44 includes a plurality of grooves extending in the direction indicated by the arrow B.

The second separator 26 has a first oxygen-containing gas flow field 46 on a surface 26a facing the first membrane electrode assembly 22a. The first oxygen-containing gas flow field 46 is connected to the oxygen-containing gas supply passage 30a and the oxygen-containing gas discharge passage 30b. For example, the first oxygen-containing gas flow field 46 includes a plurality of grooves extending in the direction indicated by the arrow C. The second separator 26 has a second fuel gas flow field 48 on a surface 26b facing the second membrane electrode assembly 22b. The second fuel gas flow field 48 is connected to the fuel gas supply passage 32a and the fuel gas discharge passage 32b.

The third separator 28 has a second oxygen-containing gas flow field 50 on a surface 28a facing the second membrane electrode assembly 22b. The second oxygen-containing gas flow field 50 is connected to the oxygen-containing gas supply passage 30a and the oxygen-containing gas discharge passage 30b. A surface 28b of the third separator 28 and the surface 24b of the first separator 24 are overlapped with each other to form the coolant flow field 44.

A first seal member 52 is formed integrally on surfaces 24a, 24b of the first separator 24 around the outer end of the first separator 24. A second seal member 54 is formed integrally on surfaces 26a, 26b of the second separator 26 around the outer end of the second separator 26. Further, a third seal member 56 is formed integrally on surfaces 28a, 28b of the third separator 28 around the outer end of the third separator 28.

As shown in FIG. 2, a plurality of resin load receivers 60 are provided integrally with the outer end of the first separator 24. A pair of holes 62a, 62b is provided in parallel in each of the load receivers 60.

A plurality of resin load receivers 64, 66 are provided integrally with the second separator 26 and the third separator 28, respectively, at positions overlapped with the load receivers 60 of the first separator 24 in the direction indicated by the arrow A. The load receivers 64, 66 have holes 68a, 68b, 70a, 70b, respectively, and the holes 68a, 68b, 70a, 70b are connected to the holes 62a, 62b of the load receivers 60 in the direction indicated by the arrow A.

Figure 3:
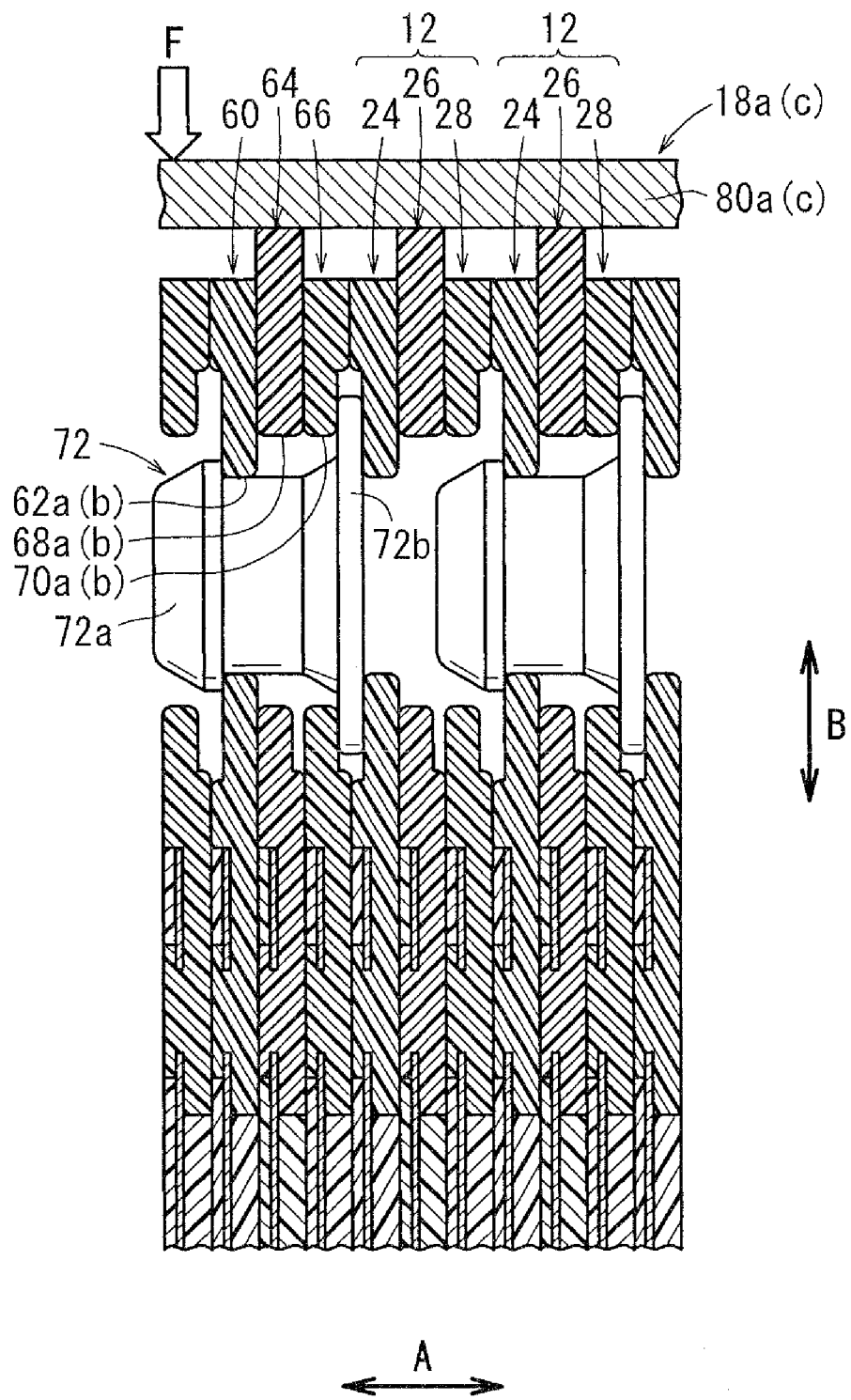
FIG. 3 is an enlarged cross sectional view showing main components of the fuel cell stack.

As shown in FIG. 3, the diameter of the holes 62a, 62b is smaller than the diameter of the holes 68a, 68b, 70a, 70b. Among the load receivers 60, 64, 66, at least the load receivers 64 protrude outwardly beyond the other load receivers 60, 66. As described later, the load receivers 64 receive a load applied from the outside (external load) through the box 14, and function as resin guides when the fuel cell units 12 are stacked together.

It should be noted that all of the load receivers 60, 64, 66 may protrude outwardly, and the load may be received by all of the load receivers 60, 64, 66. Further, only the second separator 26 may have the load receivers 64, and the first separator 24 and the third separator 28 may not have the load receivers 60, 66.

In the stacking direction, fuel cell units 12 to which connecting members such as insulating resin clips 72 are inserted into the holes 62a, 68a, 70a, and fuel cell units 12 to which the resin clips 72 as the connecting members are inserted into the holes 62b, 68b, 70b are arranged alternately.

Each of the resin clips 72 includes a neck 72a engaged with first separator 24, and a flange 72b having a large diameter to contact the third separator 28 such that the first separator 24, the second separator 26, and the third separator 28 are fixed together in the stacking direction.

Figure 4:
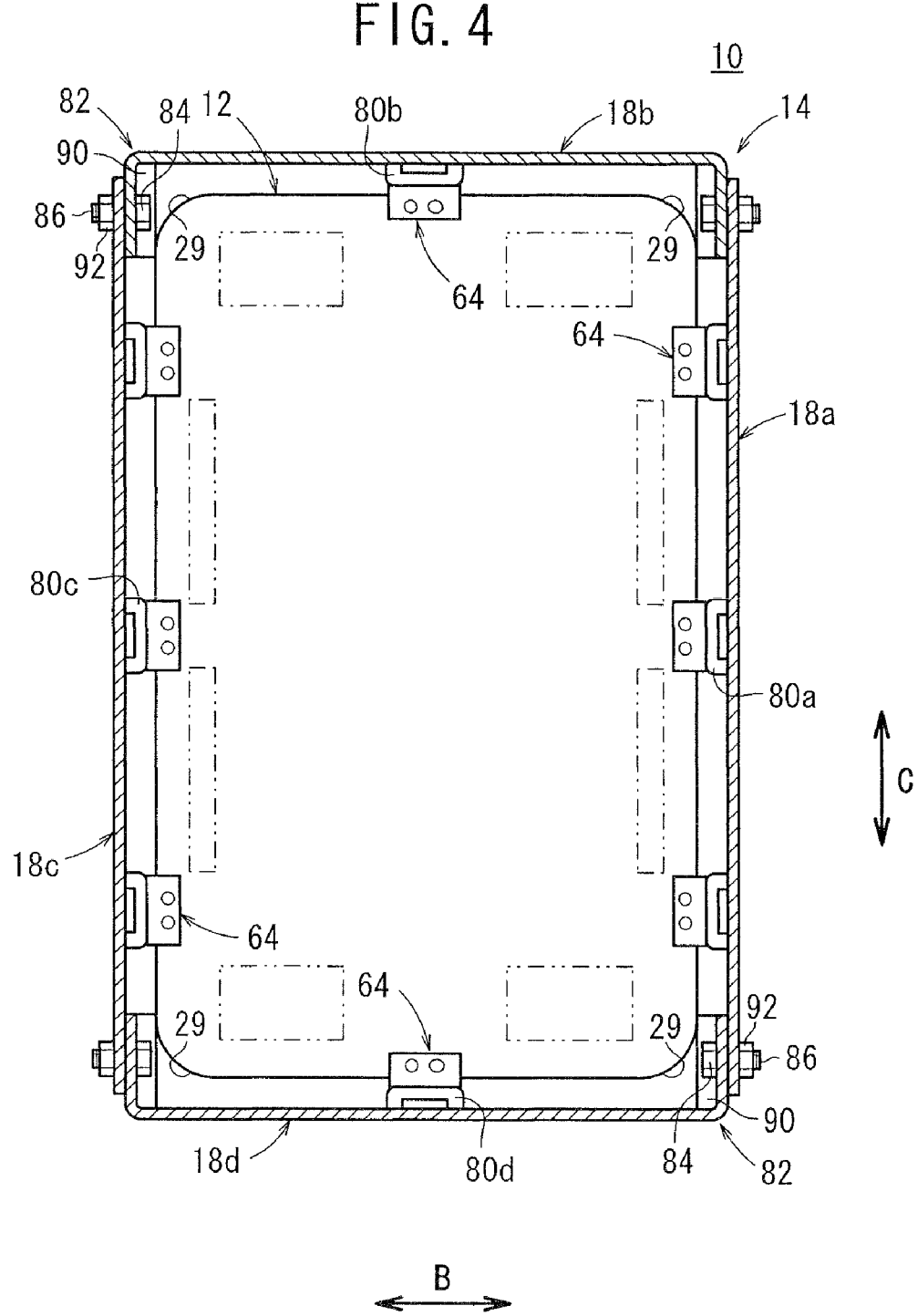
FIG. 4 is a cross sectional view showing the fuel cell stack.

As shown in FIG. 4, the side panels 18a to 18d of the box 14 have guide receivers 80a to 80d that abut against the load receivers 64 for receiving the external load. The guide receivers 80a, 80c are provided at three positions, respectively, corresponding to the load receivers 64. The guide receivers 80b, 80d are provided at one position corresponding to the load receivers 64. The guide receivers 80a to 80d are ribs expanding integrally from the inner surfaces of the side panels 18a to 18d. The guide receivers 80a to 80d extend in the stacking direction of the fuel cell units 12 in the direction indicated by the arrow A (see FIG. 1).

Figure 5:
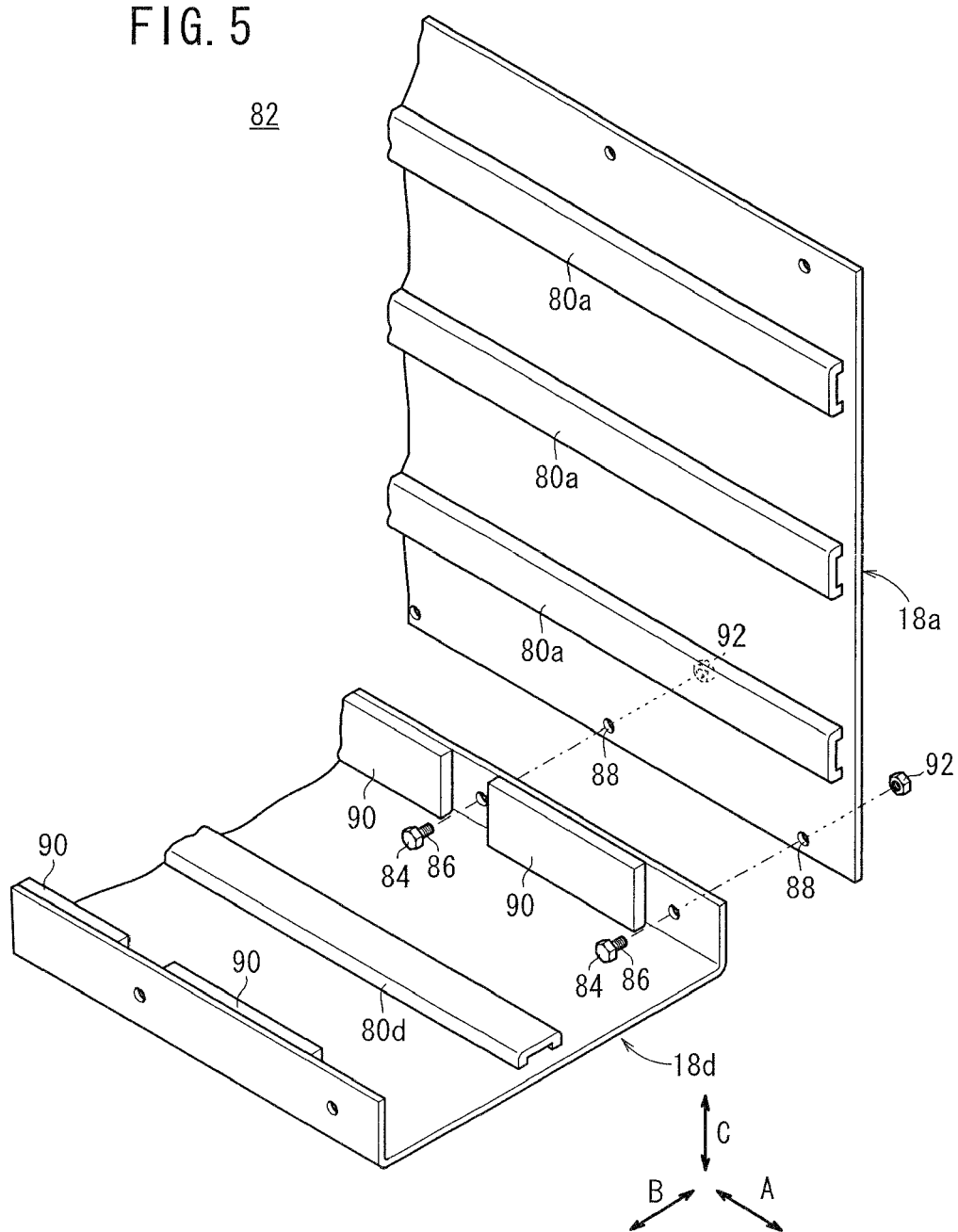
FIG. 5 is a partially exploded perspective view showing a box of the fuel cell stack.

Pressure receivers 82 are provided at respective coupling portions of the side panels 18a to 18d. As shown in FIGS. 4 and 5, the coupling portions of the side panels 18a, 18d include bolt members 84 provided at a rising edge of the side panel 18d, at predetermined intervals in the direction indicated by the arrow A. Each of the bolt members 84 is fixed to the rising edge of the side panel 18d by welding such as spot welding. Threaded portions 86 of the bolt members 84 protrude outwardly from the side panel 18d.

Holes 88 are provided at a lower end of the side panel 18a, at predetermined intervals in the direction indicated by the arrow A, for inserting the threaded portions 86 into the holes 88. Resin receivers 90 are attached to the rising edge of the side panel 18d. The resin receivers 90 are divided by the bolt members 84. Instead of the resin receivers 90, metal receivers or rubber receivers may be used.

The threaded portions 86 of the bolt members 84 are inserted into the holes 88 of the side panel 18a. The tip ends of the threaded portions 86 exposed to the outside from the holes 88 are screwed into nuts 92 to couple the side panel 18a and the side panel 18d together. The coupling portion between the side panels 18a, 18b, the coupling portion between the side panels 18b, 18c, and the coupling portion between the side panels 18c, 18d have the same structure as the coupling portion between the side panels 18d, 18a.

Operation of the fuel cell stack 10 will be described.

Firstly, as shown in FIG. 1, in the fuel cell stack 10, the oxygen-containing gas (air) is supplied to the oxygen-containing gas supply passage 30a, and the fuel gas such as the hydrogen-containing gas is supplied to the fuel gas supply passage 32a. Further, the coolant such as pure water, ethylene glycol, or oil is supplied to the two coolant supply passages 34a.

As shown in FIG. 2, the oxygen-containing gas is supplied to the oxygen-containing gas supply passage 30a of the fuel cell unit 12 in the direction indicated by the arrow A, and flows into the first oxygen-containing gas flow field 46 of the second separator 26 and the second oxygen-containing gas flow field 50 of the third separator 28. The oxygen-containing gas supplied into the first oxygen-containing gas flow field 46 flows along the cathode 40 of the first membrane electrode assembly 22a, and the oxygen-containing gas supplied into the second oxygen-containing gas flow field 50 flows along the cathode 40 of the second membrane electrode assembly 22b for inducing an electrochemical reaction at the cathodes 40.

The fuel gas is supplied through the fuel gas supply passage 32a into the first fuel gas flow field 42 of the first separator 24 and the second fuel gas flow field 48 of the second separator 26 of the fuel cell unit 12. Thus, the fuel gas flows along the anodes 38 of the first membrane electrode assembly 22a and the second membrane electrode assembly 22b for inducing an electrochemical reaction at the anodes 38.

Thus, in each of the first membrane electrode assemblies 22a and the second membrane electrode assemblies 22b, the oxygen-containing gas supplied to the cathode 40, and the fuel gas supplied to the anode 38 are consumed in the electrochemical reactions at catalyst layers (not shown) of the cathode 40 and the anode 38 for generating electricity.

Then, the oxygen-containing gas consumed at each cathode 40 flows into the oxygen-containing gas discharge passage 30b, and is discharged from the fuel cell stack 10. Likewise, the fuel gas consumed at each anode 38 flows into the fuel gas discharge passage 32b, and is discharged from the fuel cell stack 10.

Further, the coolant flows from the coolant supply passages 34a to the coolant flow field 44 between the fuel cell units 12, and flows in the direction indicated by the arrow B. After the coolant is used for skip cooling of the first membrane electrode assembly 22a and the second membrane electrode assembly 22b, the coolant flows through the coolant discharge passages 34b, and is discharged from the fuel cell stack 10.

The fuel cell stack 10 is used in an automobile application, and mounted in a vehicle (not shown). The stacking direction of the fuel cell stack 10 is oriented to the longitudinal direction of the vehicle (in the direction indicated by the arrow A). When an external load F is applied to a side of the fuel cell stack 10 (see FIG. 3), the fuel cell units 12 move in the direction indicated by the arrow B in the box 14.

In each of the fuel cell units 12, the load receivers 64 protruding outwardly are provided on the outer periphery of the second separator 26. In the structure, when the external load F is applied to move the fuel cell units 12 toward the side panel 18a, for example, the load receivers 64 abut against and are supported by the guide receivers 80a of the side panel 18a (see FIG. 4).

At each of the coupling portions between the side panel 18a and the side panel 18b, and the coupling portion between the side panel 18a and the side panel 18d, the pressure receivers 82 are provided. Therefore, when the fuel cell units 12 move toward the side panel 18a, the respective load receivers 64 abut against and are supported by the guide receivers 80a, and the curved portions 29 at both of upper and lower positions of the fuel cell units 12 abut against the resin receivers 90 of the pressure receivers 82.

In the structure, the external load F is received by the load receivers 64, the guide receivers 80, the curved portions 29, and the resin receivers 90. Thus, the external load F is suitably distributed, and the local surface pressure applied to each of the fuel cell units 12 is reduced. Accordingly, it is possible to effectively prevent the fuel cell units 12 from being damaged.

Thus, for the fuel cell stack 10 in the structure, it is possible to reliably prevent lateral displacement of the fuel cell units 12 due to the external load F. With the simple structure, reduction in the overall size and weight of the fuel cell stack 10 is achieved.

Further, in comparison with the conventional structure, the number of components in the fuel cell stack 10 is small. Thus, the fuel cell stack 10 can be assembled easily. Further, improvements in air ventilation and water discharge in the fuel cell stack 10 are achieved easily.

In the first embodiment, the fuel cell unit 12 includes the two membrane electrode assemblies (first and second membrane electrode assemblies 22a, 22b) and three separators (first to third separators 24, 26, 28). However, the present invention is not limited in this respect. For example, the fuel cell unit 12 may include one membrane electrode assembly and two separators. Also in second to fourth embodiments as described later, the present invention is not limited to the fuel cell unit including the two membrane electrode assemblies and three separators.

Figure 6:
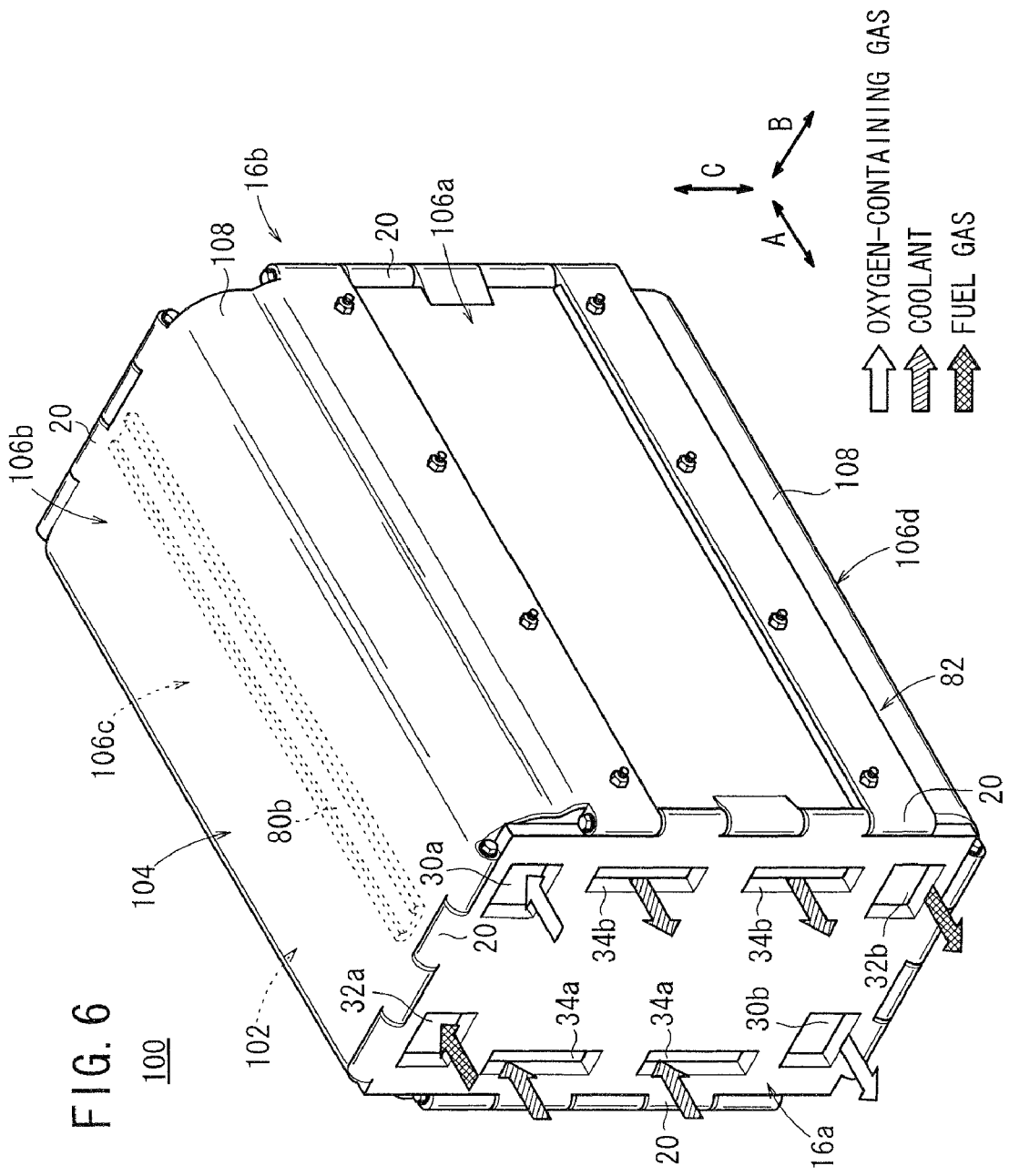
FIG. 6 is a perspective view schematically showing a fuel cell stack according to a second embodiment of the present invention.
Figure 7:
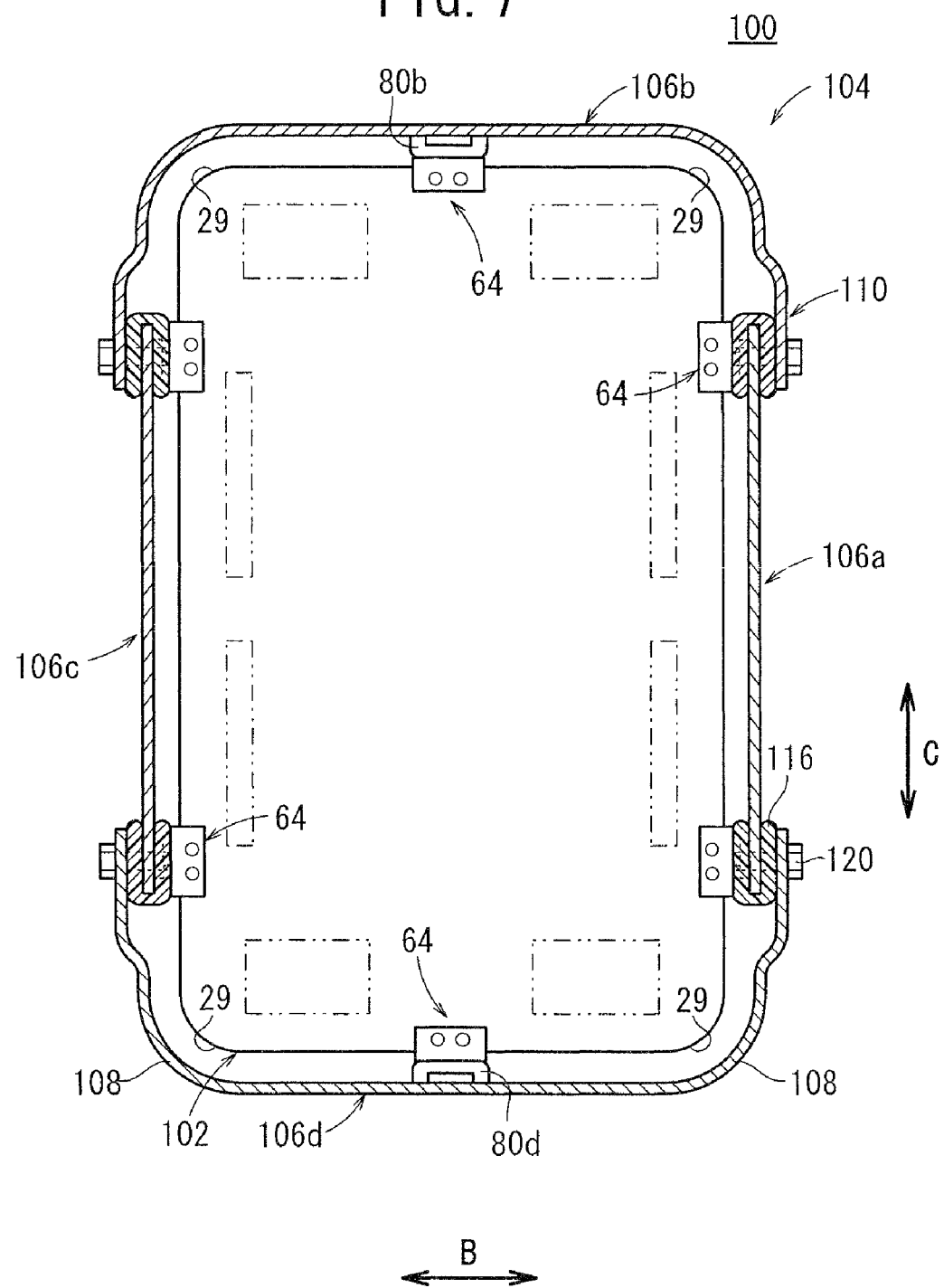
FIG. 7 is a cross sectional view showing the fuel cell stack.

FIG. 6 is a perspective view schematically showing a fuel cell stack 100 according to a second embodiment of the present invention. FIG. 7 is a cross sectional view showing the fuel cell stack 100. The constituent elements that are identical to those of the fuel cell stack 10 according to the first embodiment are labeled with the same reference numeral, and description thereof will be omitted.

The fuel cell stack 100 includes a plurality of fuel cell units 102 stacked in a direction indicated by an arrow A and a box 104 containing the fuel cell units 102. The box 104 includes four side panels (panel members) 106a to 106d provided on four sides of the fuel cell units 102. The side panels 106a, 106c are flat plates. Each of the side panels 106b, 106d includes pressure receivers 108 curved corresponding to the curved portions 29 of the fuel cell unit 102, at opposite ends in the direction indicated by the arrow B. The pressure receiver 108 has a circular arc shape in cross section for supporting the load, i.e., for receiving the external load when the curved portion 29 abuts against the pressure receiver 108.

As shown in FIG. 7, each of the fuel cell units 102 has two load receivers 64 at each of the opposite ends in the direction indicated by the arrow B, and one load receiver 64 at each of the opposite ends (upper and lower ends) in the direction indicated by an arrow C.

Guide receivers 110 are provided at the respective coupling portions of the side panels 106a to 106d of the box 104, corresponding to the load receivers 64 provided at the opposite ends in the direction indicated by the arrow B. In the structure, impact loads can be absorbed easily by deformation of the coupling portions.

Figure 8:
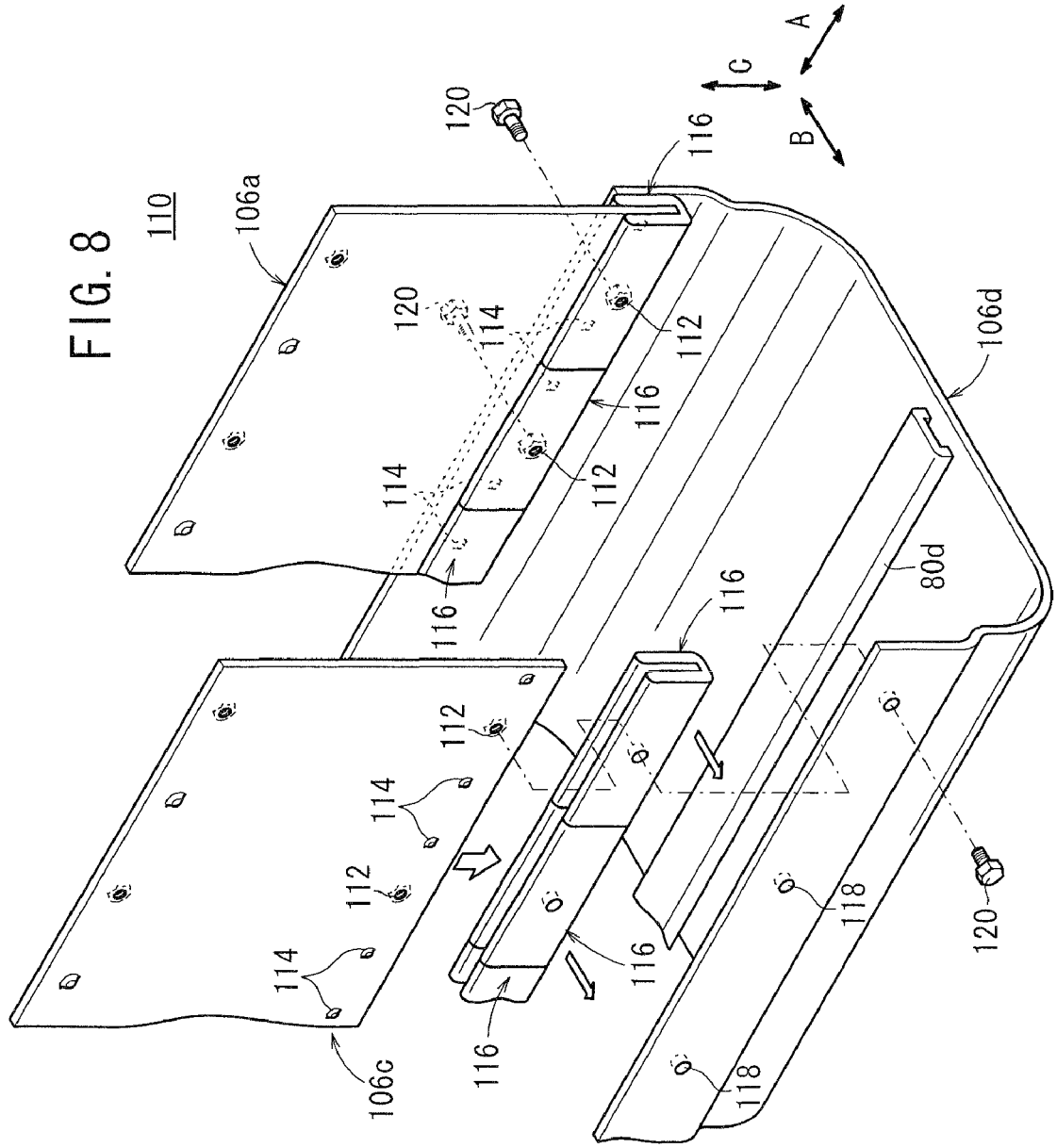
FIG. 8 is a partially exploded perspective view showing a box of the fuel cell stack.

As shown in FIG. 8, the coupling portions between the side panels 106a, 106d and the side panels 106c, 106d include nuts 112 formed integrally with the panels 106a, 106c at predetermined intervals along the direction indicated by the arrow A, and two projections 114 such as dowels, pins, or burred portions provided between the nuts 112.

Resin receivers 116 formed to have a substantially U-shaped cross section are attached to lower ends of the side panels 106a, 106c. The resin receivers 116 are divided in the stacking direction, and the resin receivers 116 are prevented from detachment by the projections 114. Instead of the resin receivers 116, metal receivers or rubber receivers may be used.

At opposite ends of the side panels 106d in the direction indicated by the arrow B, a plurality of holes 118 are formed corresponding to the positions of the nuts 112. Bolts members 120 are inserted into the holes 118, and screwed into the nuts 112.

In the second embodiment, when an external load is applied to a side of the fuel cell stack 100, the fuel cell units 102 move toward the side panel 106a, for example.

Thus, firstly, the load receivers 64 provided in each of the fuel cell units 102 abut against and are supported by the resin receivers 116 of the guide receivers 110. Then, the curved portions 29 abut against and are supported by the pressure receivers 108 of the side panels 106a, 106b. Thus, the external load applied to the side of the fuel cell stack 100 is suitably distributed to the load receivers 64, the resin receivers 116, the curved portions 29, and the pressure receivers 108.

Accordingly, in the second embodiment, the same advantages as in the case of the first embodiment can be obtained. For example, it is possible to reliably prevent the lateral displacement of the fuel cell units 102, and with the simple structure, reduction in the overall size and weight of the fuel cell stack 100 is achieved.

Further, the resin receivers 116 are divided along the stacking direction indicated by the arrow A. In the structure, when the fuel cell units 102 abut against the resin receivers 116, the resin receivers 116 are not damaged necessarily.

Figure 9:
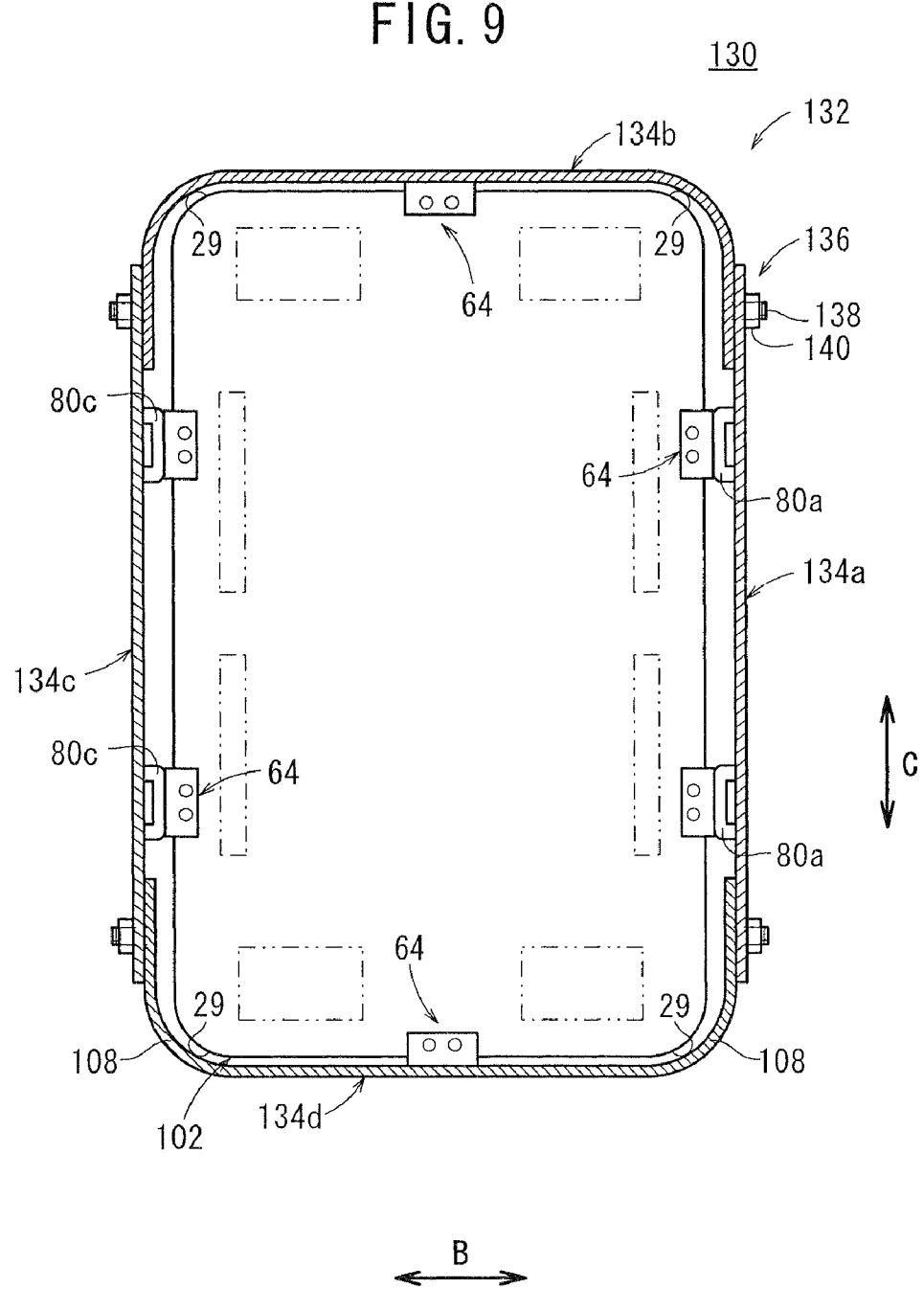
FIG. 9 is a cross sectional view showing a fuel cell stack according to a third embodiment of the present invention.

FIG. 9 is a cross sectional view showing a fuel cell stack 130 according to a third embodiment of the present invention. The constituent elements that are identical to those of the fuel cell stack 100 according to the second embodiment are labeled with the same reference numeral, and description thereof will be omitted. Further, also in the fourth embodiment as described later, the constituent elements that are identical to those of the fuel cell stack 100 according to the second embodiment are labeled with the same reference numeral, and description thereof will be omitted.

The fuel cell stack 130 includes a plurality of fuel cell units 102 stacked and a box 132 containing the fuel cell units 102. The box 132 includes four side panels (panel members) 134a to 134d. Guide receivers 80a, 80c are provided on inner surfaces of the side panels 134a, 134c for abutment against the load receivers 64. A smoothing process is applied to inner surfaces of the side panels 134b, 134d. Thus, the load receivers 64 are slidable directly on the inner wall surfaces of the side panels 134b, 134d.

Coupling portions 136 between the side panels 134a to 134d include bolts 138 fixed to the side panels 134b, 134d integrally. The bolts 138 extend through the side panels 134a, 134c, and are exposed to the outside. Tips of the bolts 138 are screwed into nuts 140.

In the third embodiment, the external load to the fuel cell units 102 and the box 132 is distributed to the load receivers 64, the guide receivers 80a, 80c, the curved portions 29, and the pressure receivers 108. Thus, the same advantages as in the cases of the first and second embodiments can be obtained.

Figure 10:
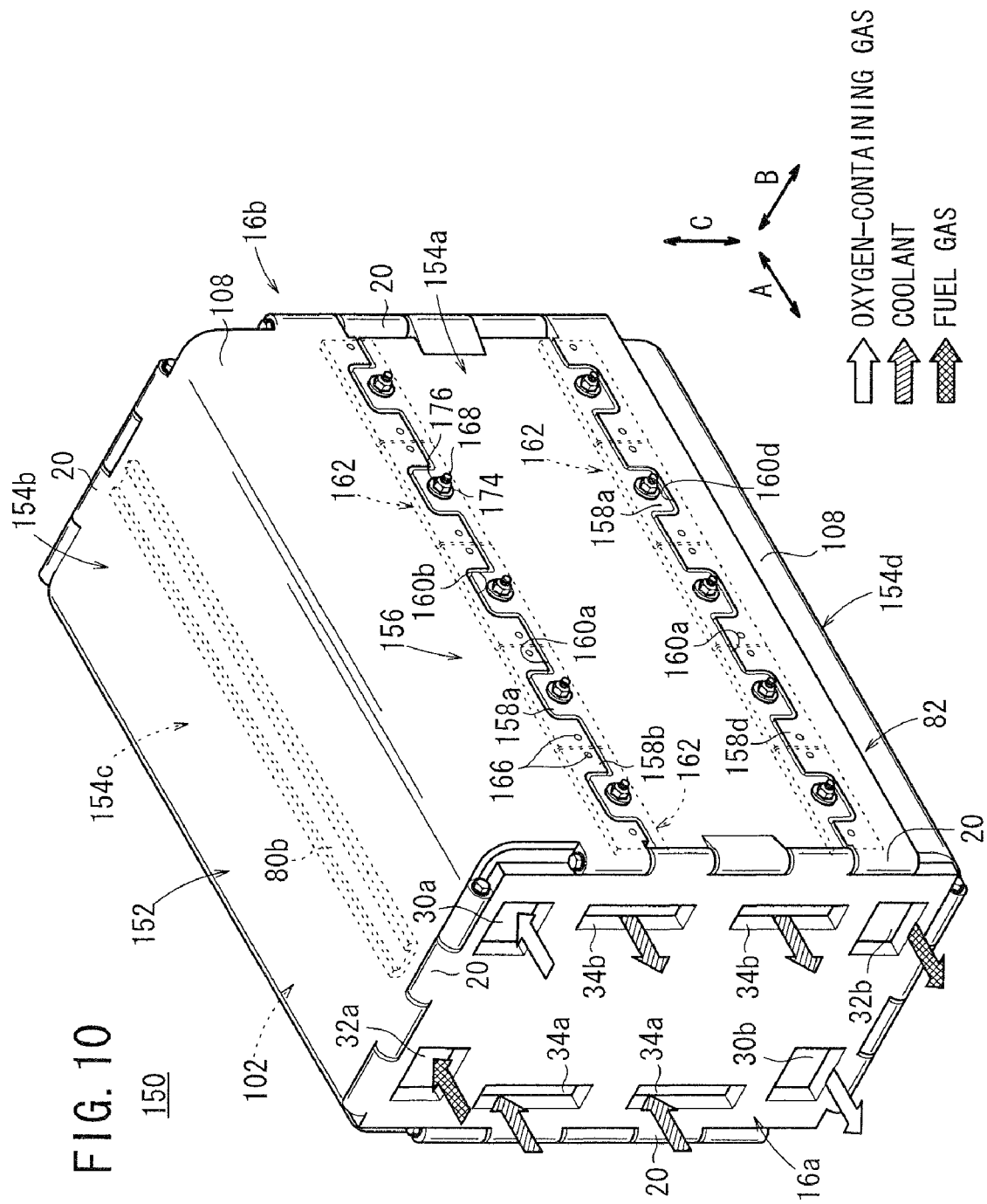
FIG. 10 is a perspective view schematically showing a fuel cell stack according to a fourth embodiment of the present invention.
Figure 11:
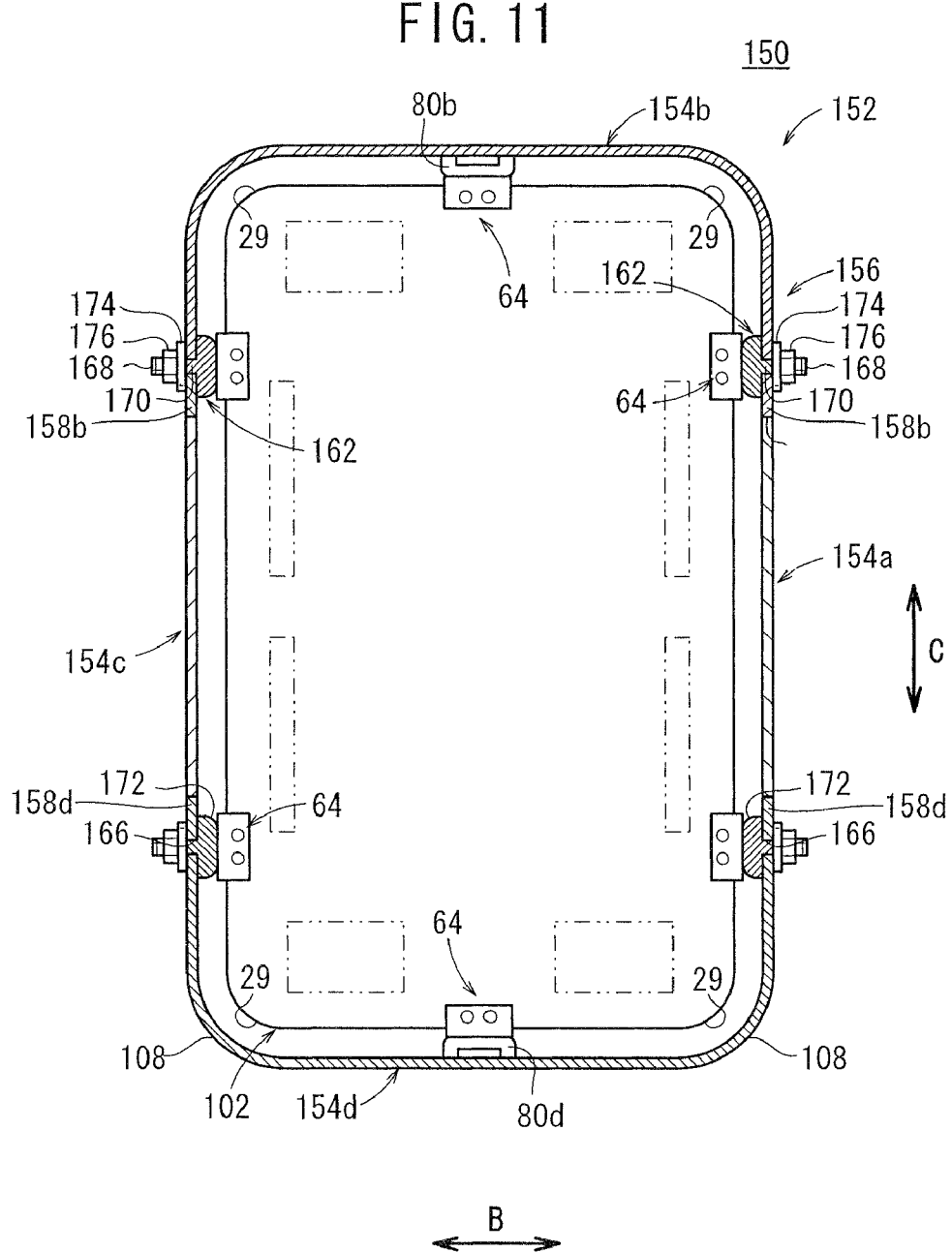
FIG. 11 is a cross sectional view showing the fuel cell stack.

FIG. 10 is a perspective view schematically showing a fuel cell stack 150 according to the fourth embodiment of the present invention. FIG. 11 is a cross sectional view showing the fuel cell stack 150. The fuel cell stack 150 includes a plurality of fuel cell units 102 stacked in a direction indicated by an arrow A and a box 152 containing the fuel cell units 102. The box 152 includes four side panels (panel members) 154a to 154d provided on four sides of the fuel cell units 102.

Guide receivers 156 are provided at coupling portions between the side panels 154a to 154d of the box 152, corresponding to load receivers 64 provided at opposite ends in the direction indicated by an arrow B.

The side panel 154a (one of the panel members) has first protrusions 158a and first recesses 160a at its opposite end surfaces in a direction indicated by an arrow C. The first protrusions 158a and the first recesses 160a are arranged alternately along the stacking direction of the fuel cell units 102 indicated by the arrow A. The side panel 154b (the other panel member) has second recesses 160b and second protrusions 158b alternately in the stacking direction. The first protrusions 158a protrude into the second recesses 160b, and the second protrusions 158b protrude into the first recesses 160a.

At the coupling portion between the side panels 154a, 154b, in the state where the first and second protrusions 158a, 158b protrude into the first and second recesses 160a, 160b, the side panel 154a and the side panel 154b are fixed together through receivers 162.

Figure 12:
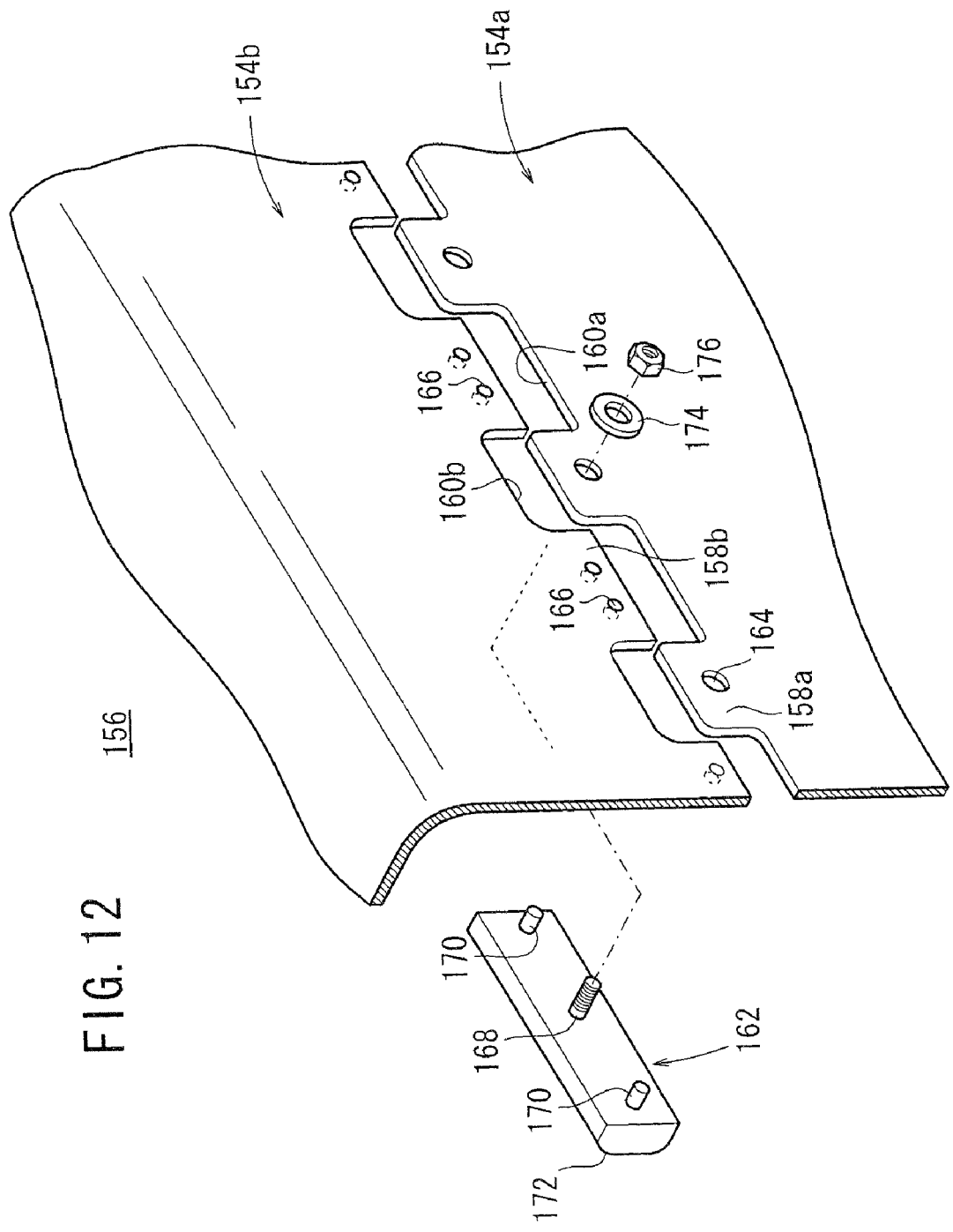
FIG. 12 is an exploded perspective view showing a side panel and a receiver of the fuel cell stack.

The receivers 162 are made of resin, metal, or rubber, and separately provided in the stacking direction. As shown in FIG. 12, bolt insertion holes 164 are provided in the first protrusions 158a of the side panel 154a, and holes 166 for use in welding are provided in the second protrusions 158b of the side panel 154b. Bolts 168 are fixed to the receivers 162 by, e.g., crimping, welding, FSW (Friction Stir Welding), adhesion, or press fitting.

Projections 170 are provided on both sides of each bolt 168, corresponding to the holes 166 provided in the second protrusions 158b. In the case where the receivers 162 are made of metal, the projections 170 are used, e.g., for projection welding. In the case where the receivers 162 are made of resin, the projections 170 function as positioning dowels. A curved portion 172 or a flat portion is formed on an internal surface of the receiver 162 (on a surface of the receiver 162 facing the fuel cell units 102).

The receivers 162 are provided inside the side panel 154b, and the projections 170 are inserted into the holes 166 formed in the second protrusions 158b, and welded, e.g., by projection welding. Therefore, the receivers 162 are fixed to the side panel 154b beforehand.

In the state where the first protrusions 158a of the side panel 154a protrude into the second recesses 160b, the bolts 168 are inserted into the holes 164 formed in the respective first protrusions 158a. Then, washers 174 and nuts 176 are attached to the bolts 168 to fix the side panel 154a and the side panel 154b together.

The coupling portion between the side panels 154a, 154b is flat, and, for example, no edges of the side panel 154a bulge on the outer surface of the box 152.

The coupling portion between the side panels 154b, 154c, the coupling portion between the side panels 154c, 154d, and the coupling portion between the side panels 154d, 154a have the same structure as the coupling portion between the side panels 154a, 154b. The same constituent components are labeled with the same reference numbers and alphabets (b to d), and the detailed description will be omitted.

In the fourth embodiment, the coupling portions of the side panels 154a to 154d do not protrude from the outer surface of the box 152. Thus, for example, when lines such as harnesses are placed adjacent to the outer surface of the box 152, it is possible to suitably prevent disconnection or the like of the lines.

Further, it is possible to make the overall size of the box 152 be substantially the same as the outer size of the fuel cell units 102, as much as possible. Accordingly, reduction in the overall size of the fuel cell stack 150 is achieved, and reduction in the overall weight of the box 152 is achieved.

Figure 13:
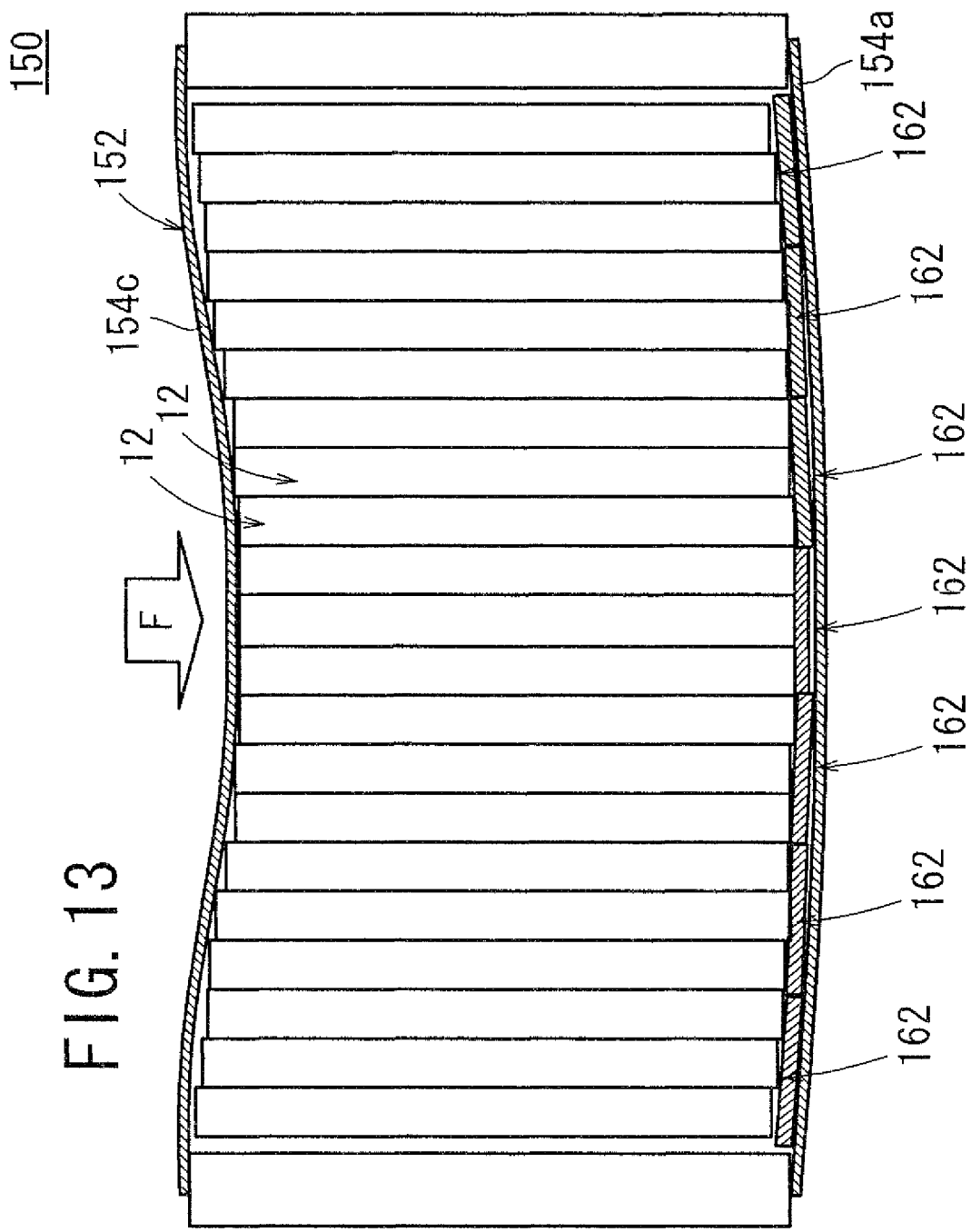
FIG. 13 is a view showing operation when an external load is applied to the fuel cell stack.

Further, the receivers 162 are provided separately in the stacking direction indicated by the arrow A, and the coupling portions between the side panels 154a to 154d are not joined together by overlapping their ends. Thus, as shown in FIG. 13, when an external load F is applied to a side of the fuel cell stack, or when an inertia force of the separator (not shown) is applied in the same direction as the external load F, the receivers 162 absorb deformation of the panels. In addition, it is possible to suitably prevent occurrence of local stress concentration, for example, in the side panel 154a.

The fourth embodiment is adapted to the guide receivers 156. Alternatively, for example, the fourth embodiment may also be adapted to the pressure receivers 82 of the fuel cell stack 10 according to the first embodiment.

Figure 14:
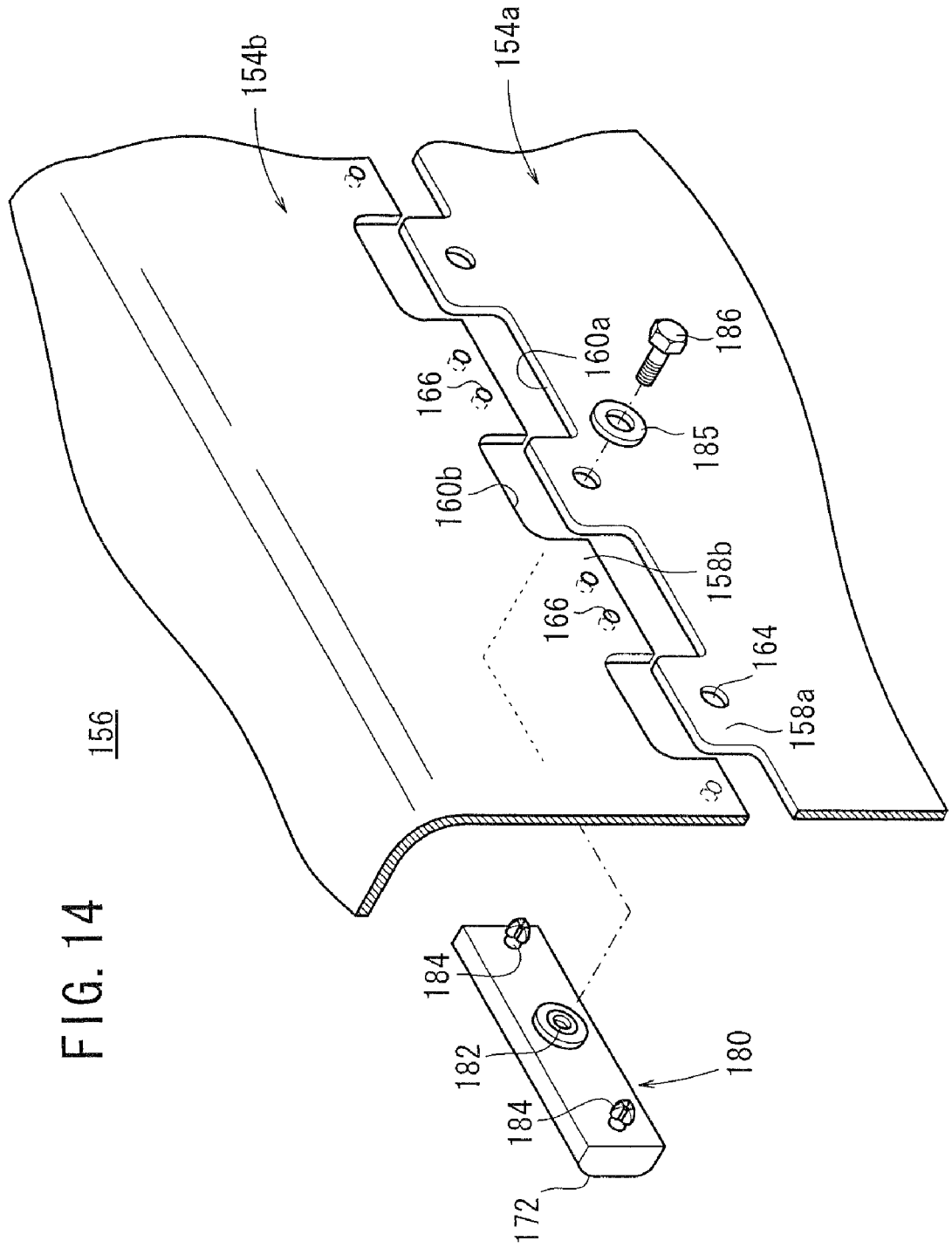
FIG. 14 is an exploded perspective view showing the side panel and another receiver.

Further, instead of the receiver 162, resin receivers 180 as shown in FIG. 14 may be used. A metal nut member 182 is embedded or fitted at the center of the resin receiver 180, e.g., by crimping, press fitting or the like. Resin clips 184 are attached to both sides of the nut member 182. In each resin receiver 180, the resin clips 184 are inserted into holes 166 of the side panel 154b, and the bolt 186 is inserted into the hole 164 through a washer 185 from the outside of the side panel 154a. The bolt 186 is screwed into the nut member 182. Thus, the side panel 154a and the side panel 154b are fixed together through the resin receivers 180.

In the first to fourth embodiments, at the corners of the separator, the curved portions 29 are used. Instead of the curved portions 29, substantially straight portions may be used. In this case, the pressure receivers 108 as the supports have a substantially straight shape instead of the curved shape.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising fuel cells stacked together, and a box containing said fuel cells, said fuel cells each formed by stacking an electrolyte electrode assembly and a separator having a substantially rectangular shape, said electrolyte electrode assembly including a pair of electrodes and an electrolyte interposed between said electrodes, said fuel cell stack comprising:
a plurality of guides provided at an outer end of said fuel cell such that at least one guide protrudes outwardly from each of four sides of the separator; and
a plurality of guide receivers protruding inwardly from respective sides of said box, said guide receivers being configured to abut against corresponding ones of said guides for receiving the external load.

2. A fuel cell stack according to claim 1, further comprising a pressure receiver provided in at least one of corners in said box, said pressure receiver being configured to abut against a corner of said separator for receiving the load.

3. A fuel cell stack according to claim 2, wherein said pressure receiver includes a support which is curved or bent corresponding to a shape of said corner of said separator.

4. A fuel cell stack according to claim 2, wherein said pressure receiver or said guide receivers include a coupling portion for coupling panel members of said box together.

5. A fuel cell stack according to claim 4, wherein said coupling portion comprising:
a protrusion provided in an end of one of adjacent panel members, said protrusion protruding in a direction intersecting a stacking direction of the fuel cells, and along outer surfaces of said panel members;
a recess provided in an end of the other of said panel members, said protrusion protruding into said recess; and
a receiver for fixing said one of said panel members and said other of said panel members together in a state where said protrusion protrudes into said recess.

6. A fuel cell stack according to claim 5, wherein said protrusion includes a plurality of first protrusions, and said first protrusions and first recesses are provided alternately in the stacking direction in said one of said panel members; and said recess includes a plurality of second recesses, and said second recesses and second protrusions are provided alternately in the stacking direction in said other of said panel members, wherein said first protrusions protrude into said second recesses, and said second protrusions protrude into said first recesses.

7. A fuel cell stack comprising fuel cells stacked together, and a box containing said fuel cells, said fuel cells each formed by stacking an electrolyte electrode assembly and a separator having a substantially rectangular shape, said electrolyte electrode assembly including a pair of electrodes and an electrolyte interposed between said electrodes, said fuel cell stack comprising:
- a plurality of guides provided at an outer end of said fuel cell such that at least one guide protrudes outwardly from each of four sides of the separator;
- a plurality of guide receivers provided in said box, said guide receivers being configured to abut against corresponding ones of said guides for receiving the external load, said guide receivers being divided in a stacking direction of said fuel cells.

8. A fuel cell stack according to claim 7, wherein said guide receivers include a coupling portion for coupling panel members of said box together; said coupling portion includes a plurality of receivers divided in the stacking direction; and a joint member for fixing said panel members together through said receiver.

9. A fuel cell stack according to claim 7, further comprising a pressure receiver provided in at least one of corners in said box, said pressure receiver being configured to abut against a corner of said separator for receiving the load.

10. A fuel cell stack according to claim 9, wherein said pressure receiver includes a support which is curved or bent corresponding to a shape of said corner of said separator.

11. A fuel cell stack according to claim 8, wherein a protrusion is provided in an end of one of adjacent panel members, said protrusion protruding in a direction intersecting a stacking direction of the fuel cells, and along outer surfaces of said panel members; and
- a recess is provided in an end of the other of said panel members, said protrusion protruding into said recess.

12. A fuel cell stack according to claim 11, wherein said protrusion includes a plurality of first protrusions, and said first protrusions and first recesses are provided alternately in the stacking direction in said one of said panel members; and said recess includes a plurality of second recesses, and said recesses and said second protrusions are provided alternately in the stacking direction in said other of said panel members, wherein said first protrusions protrude into said second recesses, and said second protrusions protrude into said first recesses.

13. A fuel cell stack comprising fuel cells stacked together, and a box containing said fuel cells, said fuel cells each formed by stacking an electrolyte electrode assembly and a separator, said electrolyte electrode assembly including a pair of electrodes and an electrolyte interposed between said electrodes, said fuel cell stack comprising:
- a guide provided at an outer end of said fuel cell, said guide protruding outwardly from a side of said separator;
- a guide receiver protruding inwardly from said box, said guide receiver being configured to abut against said guide for receiving the external load; and
- a coupling portion for coupling panel members of said box together,
wherein the coupling portion includes:
- a protrusion provided in an end of one of adjacent panel members, said protrusion protruding in a direction intersecting a stacking direction of the fuel cells, and along outer surfaces of said panel members;
- a recess provided in an end of the other of said panel members, said protrusion protruding into said recess; and
- a receiver for fixing said one of said panel members and said other of said panel members together in a state where said protrusion protrudes into said recess.

14. A fuel cell stack comprising fuel cells stacked together, and a box containing said fuel cells, said fuel cells each formed by stacking an electrolyte electrode assembly and a separator, said electrolyte electrode assembly including a pair of electrodes and an electrolyte interposed between said electrodes, said fuel cell stack comprising:
- a guide provided at an outer end of said fuel cell;
- a guide receiver provided in said box, said guide receiver being configured to abut against said guide for receiving the external load, said guide receiver being divided in a stacking direction of said fuel cells; and
- a coupling portion for coupling panel members of said box together,
wherein the coupling portion includes:
- a protrusion provided in an end of one of adjacent panel members, said protrusion protruding in a direction intersecting a stacking direction of the fuel cells, and along outer surfaces of said panel members;
- a recess provided in an end of the other of said panel members, said protrusion protruding into said recess; and
- a receiver for fixing said one of said panel members and said other of said panel members together in a state where said protrusion protrudes into said recess.

* * * * *